3,316,101
STABILIZING CAROTENOID COMPOSITIONS

Benjamin Borenstein, Teaneck, and Raymond Howard Bunnell, Branchville, N.J., assignors to Hoffmann-La Roche Inc., Nutley, N.J., a corporation of New Jersey
No Drawing. Filed Aug. 3, 1965, Ser. No. 476,992
13 Claims. (Cl. 99—148)

This invention relates to water dispersible carotenoid preparations and to processes for their preparation. More particularly, this invention relates to stabilized water dispersible carotenoid preparations and to processes for the stabilization of said preparations.

Carotenoids such as canthaxanthin and apo-carotenal have attained considerable importance in technology as coloring agents. Carotenoids are yellow to red pigments which possess considerable interest as replacements for synthetic coloring agents, e.g., for use as coloring materials, for foodstuffs, because of the relationship of the carotenoids to, or their identity with, pigments occurring in plants and animals.

Carotenoids are substances which are generally insoluble in water and which are relatively high-melting. Moreover, carotenoids are substances which are very sensitive to oxidation. These characteristics militate against direct employment of the crystalline materials for coloration of foodstuffs or feedstuffs; in that form, the materials are poorly absorbed or give poor coloring effects. The water insolubility of carotenoids makes it quite difficult to obtain a homogenous color effect. Hence, the water insolubility of the carotenoids prevents their direct use for coloring agents for coloring foodstuffs having an aqueous base such as fruit juices, mineral water with fruit juices or with fruit juice flavors, ice-cream, etc., and dry products which are to be added to water in their original form or first prepared with water prior to use such as, for example, pudding powders, soup powders, powdered eggs, tomato concentrates and dry beverage bases such as lemonade powder.

There are a number of methods employed to obtain water dispersible carotenoid preparations such as that described in United States Patent No. 3,110,598, to Muller and Tamm, and United States Patent No. 2,861,891, to Bauernfeind and Bunnell.

It has been found that water dispersible carotenoid preparations wherein the carotenoid has at least one carbonyl group, i.e., an aldehyde or ketone functional group, and wherein the carotenoid is dispersed in a gelatin phase to form a colloid, the carotenoid particles of said colloid being less than two microns in diameter, suffer from the disadvantage that upon aging, e.g., six months at room temperature, water dispersibility decreases. In some cases the dry particles become insoluble even in boiling water.

It has now been found that the life of such water dispersible carotenoid preparations can be considerably enhanced, indeed more than tripled, by the addition of an alkali metal bisulfite in a mole ratio to carotenoid of at least 0.25 mole of alkali metal bisulfite to one mole carotenoid. Although there is no upper limitation on the quantity of alkali metal bisulfite employed, it would be pointless to employ more than about five moles of alkali metal bisulfite to one mole of carotenoid.

The carotenoids employed must have one or more carbonyl groups. For example, apo-carotenal, canthananthin, capsanthin, capsorubin, astacene, β-citraurin, as well as all other carotenoids having a free carbonyl group can be used.

In the present invention a carotenoid having a carbonyl group such as those mentioned above is dispersed in an aqueous gelatin medium so as to form an oil in water emulsion. If said carotenoid is first dissolved in a volatile organic carotenoid solvent, particularly a lower polyhalogenated methane, e.g., chloroform, on evaporation of said solvent an emulsion having globules of less than two microns is produced. The advantage of such emulsions is that they approach colloidal state resulting in both high tinctorial potency for the colloid, and, when the beadlet is used to color aqueous foodstuffs, the Brownian movement prevents separation of the carotenoid from the foodstuff. When the emulsion prepared by the dispersion of carbonyl carotenoids in gelatin contains particles substantially all of a size less than two microns it is believed the fine particle size increases the effective concentration of the carotenoid in contact with the gelatin in the exterior phase, and it is due to said contact that water dispersibility decreases upon aging. The alkali metal bisulfite acts so as to prevent the deleterious effect that gelatin would otherwise have on the fine particles of carotenoid.

There are a variety of processes for preparing water dispersible carotenoids wherein the carotenoid particles in the emulsion will be present, for the most part, in a size of less than two microns in diameter. For example, in United States Patent No. 3,110,598, a process is described for obtaining an emulsion of carotenoid by forming a solution of that carotenoid in a volatile water-insoluble carotenoid solvent, e.g., chloroform, and combining it with an aqueous solution of a swellable colloid and then removing the volatile solvent from the resulting emulsion.

In particular, the emulsification of canthaxanthin and β-apo-8'-carotenal employing carbon disulfide, trichloroethane or chloroform as the volatile water-insoluble carotenoid solvents is described.

In the preparation of the emulsion various additives can be employed, such as a plasticizer, e.g., sugar and/or sugar alcohols, i.e., sorbitol, mannitol, etc.; an emulsifying agent such as a salt of a higher fatty acid ester of ascorbic acid, particularly ascorbyl palmitate; an edible oil, e.g., peanut oil, vegetable oil, etc; an antioxidant, e.g., α-tocopherol, butylated hydroxy anisole, butylated hydroxy toluene, etc.; buffering agents, e.g., sodium carbonate; coloring agents other than carotenoids; etc.

A preferred manner of practicing this invention is to add a carotenoid having one or more carbonyl groups together with an emulsifying agent, e.g., ascorbyl palmitate, polysorbate 80, dioctyl sodium sulfosuccinate, etc., in chloroform into an aqueous solution of gelatin containing sodium bisulfite in a molar amount equal to at least 0.25 times the molar quantity of carotenoid being employed, to form an emulsion containing carotenoid particles of less than two microns in diameter. The chloroform is then removed, preferably by heat.

The resulting emulsion can then be dried into particulate form in a manner known per se. There are a large variety of methods by which an emulsion can be converted into dry particles, including, for example, that described in United States Patent No. 2,756,177, to Cannalonga and Magid, for forming dry beadlets by introducing droplets of the emulsion into a collecting powder and more particularly spraying the emulsion onto a starch bed which is subsequently dried so as to "set up" the emulsion droplet into a particle or beadlet. It will be recognized that the droplets sprayed onto the collecting powder could be dried prior to making contact with said powder by, for example, spraying the droplets into a heated inert gas or using an extended residence time in the gas.

The optimum size of the particles or beadlets produced by whatever means is 20–200 mesh. It is preferred that the gelatin content be 25–70% by weight of the particle or beadlet.

The following examples are intended to illustrate but not limit the above-described invention.

Example 1

Sixty grams of apo-carotenal, 6 g. of d,l-α-tocopherol, 23 g. of peanut oil and 35 g. of ascorbyl palmitate were dissolved in 450 g. chloroform. 100 g. of gelatin, 80 g. of sucrose, 15 g. of sodium bisulfite and 6 g. of sodium carbonate were dissolved in 500 ml. water. The chloroform solution was emulsified into the aqueous solution with an Eppenbach homo rod. The solution was heated to 65° C. and maintained at that temperature, with stirring, until the chloroform was substantially all removed. The emulsion was sprayed through a revolving nozzle and the droplets collected on a layer of starch. The mixture was dried at 45° C. and the excess starch removed by screening. The resulting beadlets disperse readily in 40° C. water after storage at 45° C. for 69 days, i.e., the beadlets shrink to the point where there are no obvious solid particles in the solution and no particles remain on filtration with medium speed filter paper, e.g., S & S filter paper No. 604. A similar formula without bisulfite is insoluble in 40° C. water after storage at 45° C. for 21 days, i.e., a substantial quantity of the beadlets remain visible in the solution and can be filtered out with medium speed filter paper, e.g. S & S filter paper No. 604.

Example 2

34 g. of canthaxanthin, 2.25 g. of BHT, 10 g. of coconut oil, and 22 g. of ascorbyl palmitate were dissolved in 480 g. of cholorform. 85 g. of gelatin, 85 g. of sucrose and 15 g. of sodium bisulfite were dissloved in 120 ml. of water. The chloroform solution was emulsified into the aqueous solution with an Eppenbach homo rod. The procedure was the same as that used in Example 1 above. The resulting beadlets disperse readily in 40° C. water after storage at 70° C. for 53 days, i.e., the beadlets readily disappear from view and are not recoverable by filtration with medium speed filter paper, e.g., S & S filter paper No. 604. A similar formula without bisulfite is insoluble in 40° C. water after storage under the same conditions, i.e., 70° C. for 53 days, i.e., a substantial number of beadlets remain visible and can be recovered by filtration with medium speed filter paper, e.g. S & S filter paper No. 604.

We claim:

1. A particulate product comprising a gelatin having dispersed therein particles of a composition comprising a carotenoid having at least one carbonyl group and being of less than two microns in size and an alkali metal bisulfite in a molar amount of at least 25% of the molar quantity of caratenoid in said composition.

2. A product according to claim 1 wherein the composition dispersed within the gelatin matrix contains an emulsifying agent.

3. A water dispersible particulate carotenoid product comprising a gelatin matrix present in an amount of 25% to 70% by weight having dispersed therein particles of a composition comprising a carotenoid having at least one carbonyl group and being of less than two microns in size, a water dispersing agent and an alkali metal bisulfite in a molar amount of at least 25% of the molar quantity of carotenoid in said composition.

4. A particulate carotenoid product according to claim 3 wherein the particle size is 20–200 mesh.

5. A product according to claim 3 wherein the alkali metal bisulfite is present in an amount of from 25% to 500% of the quantity of carotenoid in said product.

6. A product according to claim 3 wherein the carotenoid is selected from the group consisting of apo-carotenal, canthaxanthin and mixtures thereof.

7. A product according to claim 3 wherein the alkali metal bisulfite is sodium bisulfite.

8. A product according to claim 3 wherein the composition dispersed in the gelatin matrix contains a water dispersing agent selected from the group consisting of a salt of a higher fatty acid ester of ascorbic acid and mixtures thereof.

9. A product according to claim 3 wherein the composition dispersed in the gelatin matrix contains an antioxidant.

10. A particulate product according to claim 3 in the form of dry substantially spherical beadlets.

11. A particulate product according to claim 3 wherein the composition dispersed in the gelatin matrix also contains peanut oil, ascorbyl palmitate, sucrose and sodium carbonate.

12. In a process for producing a dry particulate water dispersible carotenoid product wherein a water soluble emulsion is formed from a carotenoid having at least one carbonyl group, an emulsifying agent and gelatin, said carotenoid present in the gelatin being of a particle size of less than two microns and said emulsion is set in dry particulate form, the improvement comprising adding an alkali metal bisulfite to the dispersion of carotenoid in the gelatin in a molar amount equal to at least 25% of the quantity of carotenoid present in said gelatin.

13. A process for the preparation of dry water-dispersible carotenoid particles of less than two microns in diameter comprising the steps of forming a solution of a carotenoid having at least one carbonyl group, a volatile organic carotenoid solvent and an emulsifying agent in an aqueous solution of gelatin containing alkali metal bisulfite in a molar amount equal to at least 25% of the molar quantity carotenoid present, removing said volatile solvent from the resulting emulsion and drying said emulsion.

References Cited by the Examiner

UNITED STATES PATENTS 2,861,891   11/1958   Bauernfeind et al. ____ 99—148
3,110,598   11/1963   Muller _____ 99—148

FOREIGN PATENTS

Fieser et al.: Advance Organic Chemistry, Reinhold Publishing Company, New York, 1961 pp. 416–417.

A. LOUIS MONACELL, *Primary Examiner.*

H. H. KLARE, *Assistant Examiner.*